United States Patent
Wu et al.

(10) Patent No.: US 12,520,202 B2
(45) Date of Patent: Jan. 6, 2026

(54) COMMUNICATION METHOD AND APPARATUS

(71) Applicant: Huawei Technologies Co., Ltd., Shenzhen (CN)

(72) Inventors: Yedan Wu, Shanghai (CN); Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 17/937,029

(22) Filed: Sep. 30, 2022

(65) Prior Publication Data

US 2023/0022834 A1    Jan. 26, 2023

Related U.S. Application Data

(63) Continuation of application No. PCT/CN2021/081287, filed on Mar. 17, 2021.

(30) Foreign Application Priority Data

Apr. 9, 2020 (CN) .................. 202010274562.0

(51) Int. Cl.
*H04W 36/00* (2009.01)
*H04W 4/40* (2018.01)
(Continued)

(52) U.S. Cl.
CPC ......... *H04W 36/0005* (2013.01); *H04W 4/40* (2018.02); *H04W 36/0072* (2013.01);
(Continued)

(58) Field of Classification Search
CPC ......... H04W 36/0005; H04W 36/0072; H04W 36/083; H04W 56/005
See application file for complete search history.

(56) References Cited

U.S. PATENT DOCUMENTS

| 5,479,409 A | 12/1995 | Dupuy et al. |
| 9,264,961 B1 | 2/2016 | Shah et al. |
| (Continued) | | |

FOREIGN PATENT DOCUMENTS

| CN | 103139855 A | 6/2013 |
| CN | 107113675 A | 8/2017 |
| (Continued) | | |

OTHER PUBLICATIONS

Geolocation_of_LTE_subscriber_stations_based_on_the_timing_advance_ranging_parameter (Year: 2011).*

(Continued)

*Primary Examiner* — Jinsong Hu
*Assistant Examiner* — Justin Barry
(74) *Attorney, Agent, or Firm* — Slater Matsil, LLP

(57) ABSTRACT

This application provides a communication method and apparatus. The method includes: A terminal device receives first information sent by a first base station, where the first information includes a first timing advance of a second base station, or the first information includes a parameter used by the terminal device to obtain the first timing advance of the second base station, and the first timing advance is a timing advance used in a process of data transmission with the second base station; and the terminal device obtains the first timing advance of the second base station based on the first information.

19 Claims, 3 Drawing Sheets

(51) Int. Cl.
  *H04W 36/08* (2009.01)
  *H04W 56/00* (2009.01)
  *H04W 72/0446* (2023.01)
  *H04W 72/25* (2023.01)
  *H04W 92/18* (2009.01)

(52) U.S. Cl.
  CPC ....... *H04W 36/083* (2023.05); *H04W 56/005* (2013.01); *H04W 72/0446* (2013.01); *H04W 72/25* (2023.01); *H04W 92/18* (2013.01)

(56) References Cited

U.S. PATENT DOCUMENTS

| | | | |
|---|---|---|---|
| 2004/0128095 A1* | 7/2004 | Oestreich | H04W 56/0045 702/89 |
| 2008/0225796 A1 | 9/2008 | Malladi et al. | |
| 2013/0070726 A1* | 3/2013 | Zhang | H04W 56/0045 370/331 |
| 2014/0308956 A1* | 10/2014 | Zhang | H04W 36/0072 455/436 |
| 2018/0213457 A1 | 7/2018 | Tang et al. | |
| 2019/0028942 A1* | 1/2019 | Tang | H04W 36/0077 |
| 2021/0099933 A1 | 4/2021 | Matsuda et al. | |
| 2022/0394562 A1* | 12/2022 | Wang | H04W 36/32 |
| 2023/0024479 A1* | 1/2023 | Ciochina | H04W 56/0045 |

FOREIGN PATENT DOCUMENTS

| | | |
|---|---|---|
| CN | 107454634 A | 12/2017 |
| CN | 107872856 A | 4/2018 |
| CN | 112020155 A | 12/2020 |
| WO | 2018089836 A1 | 5/2018 |
| WO | 2019193891 A1 | 10/2019 |

OTHER PUBLICATIONS

3rd Generation Partnership Project; Technical Specification Group Radio Access Network; Solutions for NR to support non-terrestrial networks (NTN) (RElease 16), 3GPP TR 38.821, Dec. 2019, 140 Pages, V16.0.0.

CATT., "Cell Selection and Reselection Issue in NTN System", 3GPP TSG-RAN WG2 Meeting #107, R2-1908753, Aug. 26-30, 2019, 3 Pages, Prague, Czech Republic.

* cited by examiner

COMMUNICATION METHOD AND APPARATUS

CROSS-REFERENCE TO RELATED APPLICATIONS

This application is a continuation of International Application No. PCT/CN2021/081287, filed on Mar. 17, 2021, which claims priority to Chinese Patent Application No. 202010274562.0, filed on Apr. 9, 2020. The disclosures of the aforementioned applications are hereby incorporated by reference in their entireties.

TECHNICAL FIELD

This application relates to the communication field, and more specifically, to a communication method and apparatus.

BACKGROUND

In long term evolution (LTE) or new radio (NR) communication technologies, different terminal devices (UE) perform orthogonal multiple access in time and frequency domains during uplink transmission, that is, uplink transmission of different UEs from a same cell does not interfere with each other. To ensure orthogonality of the uplink transmission and avoid intra-cell interference, moments at which signals of the different UEs in a same subframe but on different frequency domain resources (different resource blocks (RB)) arrive at a base station are generally aligned. To ensure time synchronization on a receive side (base station side), an uplink timing advance mechanism is introduced to long term evolution (LTE)/new radio (NR).

To adapt to non-terrestrial network (NTN) communication, for example, satellite communication, a satellite may be used to broadcast a common timing advance (common TA) to ensure time synchronization on the receive side in existing technologies. However, the common TA mechanism in the existing technologies relates to only broadcasting of a common TA of a local cell, but does not consider TA change arising from satellite handover in an NTN scenario.

SUMMARY

This application provides a communication method, so that a terminal device can obtain a timing advance of a next base station in advance in the case of TA change arising from base station handover in an NTN scenario.

According to a first aspect, a communication method is provided. The method includes: A terminal device receives first information sent by a first base station, where the first information includes a first timing advance of a second base station, or the first information includes a parameter used by the terminal device to obtain the first timing advance of the second base station, and the first timing advance is a timing advance used in a process of data transmission with the second base station; and the terminal device obtains the first timing advance of the second base station based on the first information.

According to the method provided in this application, the terminal device can obtain a timing advance of a next base station in advance in the case of TA change arising from base station handover in an NTN scenario.

With reference to the first aspect, in some implementations of the first aspect, the first information further includes: information about handover between the first base station and the second base station, and the information about handover includes a location and/or moment at which handover is performed between the first base station and the second base station.

With reference to the first aspect, in some implementations of the first aspect, the terminal device communicates with the second base station based on the first timing advance of the second base station and the information about handover between the first base station and the second base station.

The terminal device communicates with the second base station based on the first timing advance and the information about handover between the first base station and the second base station, so that the terminal device can be seamlessly handed over to the second base station. This avoids service interruption or signaling storms arising from base station handover.

With reference to the first aspect, in some implementations of the first aspect, the first information includes the parameter used by the terminal device to obtain the first timing advance of the second base station. The parameter includes at least one of the following: a timing advance of the first base station, a location of the terminal device, or a location of the first base station or the second base station; and the obtaining the first timing advance of the second base station based on the first information includes: obtaining, by the terminal device, the first timing advance of the second base station through calculation based on the parameter.

With reference to the first aspect, in some implementations of the first aspect, the first information includes the parameter used by the terminal device to obtain the first timing advance of the second base station. The parameter includes: a second timing advance of the second base station, where the second timing advance of the second base station is a timing advance used in a process of accessing the second base station. The obtaining the first timing advance of the second base station based on the first information includes: The terminal device initiates, based on the second timing advance of the second base station, the process of accessing the second base station; and obtains the first timing advance of the second base station in the access process.

According to a second aspect, a communication method is provided. The method includes: A first base station generates first information, where the first information includes a first timing advance of a second base station, or the first information includes a parameter used by the terminal device to obtain the first timing advance of the second base station, and the first timing advance is a timing advance used in a process of data transmission between the terminal device and the second base station; and the first base station sends the first information to the terminal device.

In the case of TA change arising from base station handover in an NTN scenario, the terminal device can obtain a timing advance of a next base station in advance based on the first information.

With reference to the second aspect, in some implementations of the second aspect, the first information further includes: information about handover between the first base station and the second base station, where the information about handover includes a location and/or moment at which handover is performed between the first base station and the second base station.

The information about handover between the first base station and the second base station is added into the first information, so that the terminal device can be further seamlessly handed over between different base stations during satellite handover in the NTN scenario. This avoids service interruption or signaling storms arising from base station handover.

With reference to the second aspect, in some implementations of the second aspect, the first information includes the parameter used by the terminal device to obtain the first timing advance of the second base station. The parameter includes at least one of the following: a timing advance of the first base station, a location of the terminal device, or a location of the first base station or the second base station.

With reference to the second aspect, in some implementations of the second aspect, the first information includes the parameter used by the terminal device to obtain the first timing advance of the second base station. The parameter includes: a second timing advance of the second base station, where the second timing advance of the second base station is a timing advance used in a process of the terminal device of accessing the second base station.

With reference to the second aspect, in some implementations of the second aspect, the first information is broadcast by the first base station.

With reference to the second aspect, in some implementations of the second aspect, the first information is sent by the second base station to the first base station, and the method further includes: receiving the first indication information sent by the second base station.

According to a third aspect, a communication apparatus is provided. The apparatus includes: a receiving module, configured to receive first information sent by a first base station, where the first information includes a first timing advance of a second base station, or the first information includes a parameter used by the communication apparatus to obtain a first timing advance of the second base station, and the first timing advance is a timing advance used in a process of data transmission with the second base station; and a processing module, configured to obtain the first timing advance of the second base station based on the first information.

According to the method provided in this application, in the case of TA change arising from base station handover in an NTN scenario, the communication apparatus can obtain a timing advance of a next base station in advance.

With reference to the third aspect, in some implementations of the third aspect, the first information further includes: information about handover between the first base station and the second base station, where the information about handover includes a location and/or moment at which handover is performed between the first base station and the second base station.

With reference to the third aspect, in some implementations of the third aspect, the apparatus further includes: a communication module, configured to communicate with the second base station based on the first timing advance of the second base station and the information about handover between the first base station and the second base station.

The terminal device communicates with the second base station based on the first timing advance and the information about handover between the first base station and the second base station, so that the terminal device can be seamlessly handed over to the second base station. This avoids service interruption or signaling storms arising from base station handover.

With reference to the third aspect, in some implementations of the third aspect, the first information includes the parameter used by the communication apparatus to obtain the first timing advance of the second base station. The parameter includes at least one of the following: a timing advance of the first base station, a location of the communication apparatus, or a location of the first base station or the second base station. The processing module is configured to obtain the first timing advance of the second base station through calculation based on the parameter.

With reference to the third aspect, in some implementations of the third aspect, the first information includes the parameter used by the communication apparatus to obtain the first timing advance of the second base station. The parameter includes: a second timing advance of the second base station, where the second timing advance of the second base station is a timing advance used in a process of accessing the second base station. The processing module is configured to initiate, based on the second timing advance of the second base station, the process of accessing the second base station; and obtain the first timing advance of the second base station in the access process.

According to a fourth aspect, a communication apparatus is provided. The apparatus includes: a generation module, configured to generate first information, where the first information includes a first timing advance of a second base station, or the first information includes a parameter used by the terminal device to obtain the first timing advance of the second base station, and the first timing advance is a timing advance used in a process of data transmission between the terminal device and the second base station; and a sending module, configured to send the first information to the terminal device.

According to the method provided in this application, the terminal device can obtain a timing advance of a next base station in advance in the case of TA change arising from base station handover in an NTN scenario. With reference to the fourth aspect, in some implementations of the fourth aspect, the first information further includes: information about handover between the communication apparatus and the second base station, where the information about handover includes a location and/or moment at which handover is performed between the communication apparatus and the second base station.

The information about handover between the first base station and the second base station is added into the first information, so that the terminal device can be further seamlessly handed over between different base stations during satellite handover in the NTN scenario. This avoids service interruption or signaling storms arising from base station handover.

With reference to the fourth aspect, in some implementations of the fourth aspect, the first information includes the parameter used by the terminal device to obtain the first timing advance of the second base station. The parameter includes at least one of the following: a timing advance of the communication apparatus, a location of the terminal device, or a location of the communication apparatus or the second base station.

With reference to the fourth aspect, in some implementations of the fourth aspect, the first information includes the parameter used by the terminal device to obtain the first timing advance of the second base station. The parameter includes: a second timing advance of the second base station, where the second timing advance of the second base station is a timing advance used in a process of accessing the second base station.

With reference to the fourth aspect, in some implementations of the fourth aspect, the first information is broadcast by the communication apparatus.

With reference to the fourth aspect, in some implementations of the fourth aspect, the first information is sent by the second base station to the communication apparatus, and the apparatus further includes: receiving the first indication information sent by the second base station.

According to a fifth aspect, a communication apparatus is provided, including a processor and a memory. The memory is configured to store a computer program, and the processor is configured to invoke the computer program from the memory and run the computer program, so that the communication device can perform the method according to any one of the first aspect or the possible implementations of the first aspect.

According to a sixth aspect, a communication apparatus is provided, including a processor and a memory. The memory is configured to store a computer program, and the processor is configured to invoke the computer program from the memory and run the computer program, so that the communication device can perform the method according to any one of the second aspect or the possible implementations of the second aspect.

According to a seventh aspect, a computer-readable storage medium is provided, configured to store a computer program. The computer program includes instructions, to perform the method according to any one of the first aspect or the possible implementations of the first aspect.

According to an eighth aspect, a computer-readable storage medium is provided, configured to store a computer program. The computer program includes instructions, to perform the method according to any one of the second aspect or the possible implementations of the second aspect.

According to a ninth aspect, a computer program product is provided, including a computer program. When the computer program is run on a computer device, the computer device is enabled to perform the method according to the first aspect.

According to a tenth aspect, a computer program product is provided, including a computer program. When the computer program is run on a computer device, the computer device is enabled to perform the method according to the second aspect.

DETAILED DESCRIPTION OF ILLUSTRATIVE EMBODIMENTS

Figure 1:
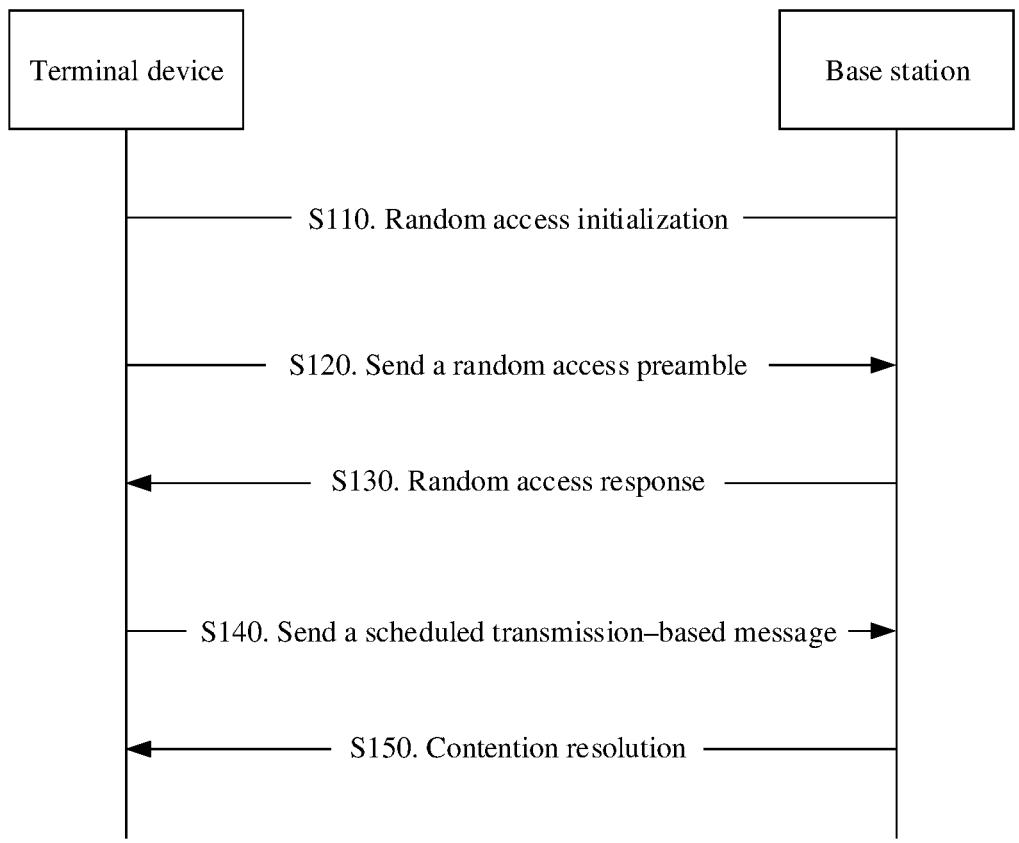
FIG. 1 is a schematic diagram of a random access process in an existing technology.

The following describes technical solutions of this application with reference to the accompanying drawings.

The technical solutions in embodiments of this application may be applied to various communication systems, for example, a code division multiple access (CDMA) system, a wideband code division multiple access (WCDMA) system, a long term evolution (LTE) system, a 5th generation (5G) or new radio (NR) system, a future evolved communication system, and the like.

In this application, terms "network" and "system" are often used interchangeably. A communication apparatus described in this application refers to a network element in a communication system, for example, a terminal, a base station (a source base station or a target base station), or a core network device.

The terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in embodiments of this application.

A base station may also be referred to as a base station device, and is a network device deployed in a radio access network that provides a wireless communication function. The base station may have different names in different radio access systems. For example, a base station in a universal mobile telecommunications system (UMTS) network is referred to as a NodeB, a base station in an LTE network is referred to as an evolved NodeB (eNB or eNodeB), and a base station in a 5G system may be referred to as a transmission reception point (TRP) or a gNodeB (gNB). The base station may include one or more co-site or non-co-site TRPs. The base station may alternatively be a radio controller, a centralized unit (CU), and/or a distributed unit (DU) in a cloud radio access network (CRAN) scenario. The base station may alternatively be a server, a wearable device, a vehicle-mounted device, or a non-terrestrial device such as a satellite. For ease of description, the following uses the base station for description. Optionally, the base station in the present invention may alternatively be user equipment in device to device (D2D). Optionally, the base station and the user equipment in the present invention may alternatively be relay devices, or a network device and user equipment that implement a relay function.

The base station may be an architecture in which a centralized unit (CU) is separated from a distributed unit (DU). A RAN may be connected to a core network (for example, an LTE core network or a 5G core network). It may be understood that the CU and the DU are obtained by dividing the base station from the perspective of logic functions. The CU and the DU may be physically separated or deployed together. A plurality of DUs may share one CU. One DU may be connected to a plurality of CUs. The CU and the DU may be connected through an interface, for example, an F1 interface. The CU and the DU may be obtained through division based on protocol layers of a wireless network. For example, a possible division manner is that: The CU is configured to perform functions of a radio resource control (RRC) layer, a service data adaptation protocol (SDAP) layer, and a packet data convergence protocol (PDCP) layer; and the DU is configured to perform functions of a radio link control (RLC) layer, a media access control (MAC) layer, a physical layer, and the like. It may be understood that division of processing functions of the CU and the DU performed based on the protocol layers is merely an example, and there may be other division. For example, the CU or the DU may have functions of more protocol layers through division. For example, the CU or the DU may alternatively have some processing functions of the protocol layers through division. In a design, some functions of the RLC layer and functions of a protocol layer above the RLC layer are configured on the CU, and remaining functions of the RLC layer and functions of a protocol layer below the RLC layer are configured on the DU. In another design, functions of the CU or the DU may alternatively be obtained through division based on service types or other system requirements. For example, division is performed based on latencies, a function whose processing time needs to meet a latency requirement is configured on the DU, and a function whose processing time does not need to meet the latency requirement is configured on the CU. One or more CUs may be centrally or separately disposed. For example, the CUs may be disposed on a network side for ease of centralized management. The DU may have a plurality of radio frequency functions, or the radio frequency functions may be configured remotely. Functions of the CU may be implemented by one entity or different entities. For example, the functions of the CU may be further divided. For example, a control plane (CP) is separated from a user plane (UP), that is, a control plane of the CU (CU-CP) is separated from a user plane of the CU (CU-UP). For example, the CU-CP and the CU-UP may be implemented by different functional entities. The CU-CP and the CU-UP may be coupled to the DU to jointly implement functions of the base station.

During uplink transmission, different UEs perform orthogonal multiple access in time and frequency domains, that is, uplink transmission of the different UEs from a same cell does not interfere with each other. To ensure orthogonality of the uplink transmission and avoid intra-cell interference, the base station requires that moments at which signals of different UEs in a same subframe but on different frequency domain resources arrive at the base station are generally aligned. As long as the base station receives, within a cyclic prefix range, uplink data sent by the UEs, the base station can correctly decode the uplink data. Therefore, uplink synchronization requires that moments at which the signals of the different UEs in a same subframe arrive at the base station all fall within the cyclic prefix range. To maintain orthogonality between uplink reference signals using different cyclic shifts, moments at which received uplink reference signals also need to be aligned. This is a reason why uplink synchronization needs to be used to ensure time alignment of uplink transmission of different UEs in a same cell. To ensure time synchronization on a receive side (base station side), an uplink timing advance mechanism is used in LTE/NR. From a perspective of a UE side, a timing advance may be considered as a negative offset between a start moment at which a downlink subframe is received and a moment at which an uplink subframe is transmitted. The base station may control, by properly controlling an offset of each UE, moments at which uplink signals from different UEs arrive at the base station. UE farther away from the base station has a higher transmission delay. Therefore, the UE farther away from the base station needs to send uplink data earlier than UE closer to the base station.

The base station notifies the UE of a TA of the UE in two manners. In a random access process, the base station determines a TA value by measuring a received preamble, and sends the TA value to the UE via a timing advance command field (11 bits in LTE, and a corresponding TA index value TA ranges from 0 to 1282; and 12 bits in NR, and a corresponding TA index value TA ranges from 0 to 3846) of a RAR. This process is an "initial uplink synchronization process". In a connected state, the base station needs to maintain timing advance information. Theoretically, any signal (SRS/DMRS/CQI/ACK/NACK/PUSCH . . . ) sent by the UE may be used to measure the timing advance. The UE side stores a latest TA adjustment value $N_{TA,old}$. After receiving a new timing advance command to obtain $T_A$, the UE calculates a latest TA adjustment value $N_{TA,new}=N_{TA,old}+(T_A-31)*16$ (unit: $T_s$).

Specifically, FIG. 1 is a schematic flowchart in which a base station notifies UE of a TA of the UE in a random access process in an existing technology. As shown in FIG. 1, the random access process includes steps S110 to S150. S110. Initialize random access. In this step, parameters are configured, where the parameters may include: a physical random access channel (PRACH) resource set for transmitting a random access preamble, an available random access preamble group (group A or group B) and an available preamble set in each group, a maximum quantity of transmissions of the preamble, an initial transmit power of the preamble, a power ramping step, a random access response window, a maximum quantity of retransmissions of a hybrid automatic repeat request (HARQ) of a third message, a contention resolution timer, and the like. S120. A terminal device sends the random access preamble (RAP) to a network device, where the random access preamble is mainly used to notify the network device that there is a random access request, so that the network device can estimate a transmission delay between the network device and the terminal device, and the access network device can calibrate an uplink timing advance and notify the terminal device of the calibrated information via a timing advance command. S130. The terminal device receives a random access response (RAR) sent by the network device, where the RAR includes an uplink timing advance, and the uplink timing advance is determined by the network device based on the received random access preamble. S140. The terminal device sends a scheduled transmission-based message to the network device. S150. The terminal device receives a contention resolution message sent by the network device, to confirm that the random access process succeeds.

To shorten a random access delay, in addition to a conventional 4-step random access method, a 5G NR system further supports a 2-step random access method. The 2-step random access method includes: A terminal device sends a first message to the base station, where the first message may include a preamble and/or a demodulation reference signal (DMRS); and sends a second message to the terminal device, where the second message may include a response message, and the response message may include information about a temporary C-RNTI, information about a timing advance command (TA command), uplink grant information, a contention resolution identifier, and the like. Because the 2-step random access method belongs to the existing technology, details are not described in this application.

It should be understood that embodiments of this application are also applicable to the 2-step random access method as well as the 4-step random access method in FIG. 1.

Satellite communication (NTN) is also referred to non-terrestrial communication. Thanks to the current concept of "anytime and anywhere" communication, a satellite communication network is playing a more important role in future. Generally, a higher orbit of a satellite indicates a larger coverage area of the satellite but a longer communication delay. Generally, there may be the following types of orbits of satellites classified by altitudes: a low earth orbit (LEO), a middle earth orbit (MEO), and a geostationary earth orbit (GEO), where an orbit altitude of the LEO ranges from 160 km to 2000 km, an orbit altitude of the MEO ranges from 2000 km to 35786 km, and an orbit altitude of the GEO is 35786 km. A position of a satellite in the GEO with respect to the earth is unaffected by earth rotation. An LEO communication satellite is closer to the ground, and has a shorter communication delay and a higher data transmission rate. In addition, a weight and size of a mobile terminal are almost the same as those of a personal mobile device. Therefore, the LEO communication satellite is more suitable for the popularization of the mass market and become a hot topic of the current industry development.

Figure 2:
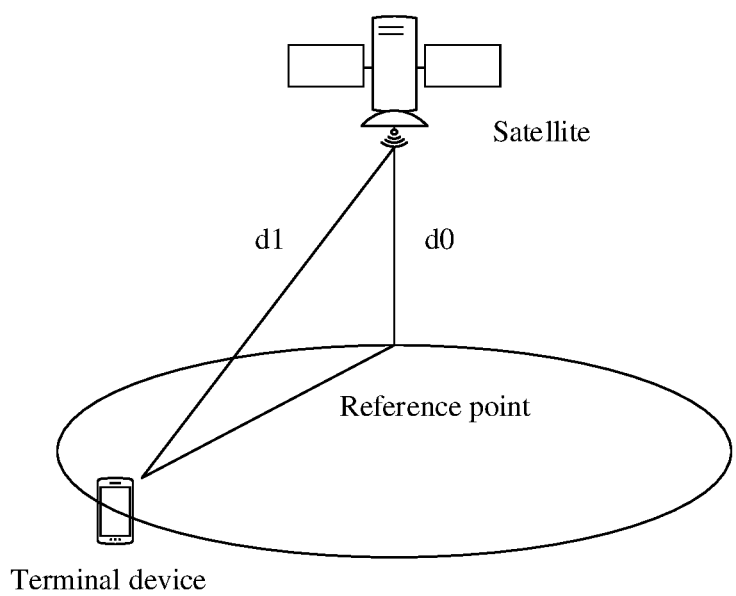
FIG. 2 is a schematic diagram of a principle of a common TA in an NTN scenario.

Because of a long delay of satellite communication, a timing advance mechanism designed in a current NR system is not applicable to the satellite communication. In the timing advance mechanism in the existing technology, a TA value ranges from 0 to 3486, and a TA value indicates a length of 39 m in the case of a 30 kHz PRACH subcarrier, and indicates a length of 78 m in the case of a 15 kHz PRACH subcarrier. However, in a random access process in the existing technology, a coverable range for a timing advance that is carried in a random access response message and that is sent by a base station to UE is about 300 km, while an orbit altitude of a satellite in satellite communication is at least 600 km. It is obvious that the timing advance mechanism in the existing technology cannot adapt to the satellite communication. To adapt to the satellite communication, in the existing technology, a method for broadcasting a common TA by a satellite may be used to notify the UE of a timing advance of the UE. FIG. 2 is a schematic diagram of a principle of a common TA mechanism. A terrestrial reference point (reference point) is selected for a satellite, which is generally a point closest to the satellite. A distance between the point and the satellite is do and a TA indicating the distance is a common TA. A TA sent by a base station to UE is a UE-specific TA in FIG. 2. Because a distance of the common TA has been subtracted from the TA value, 12 bits in a timing advance command field in an RAR may be used to represent the TA value. However, the current common TA mechanism involves only broadcasting of a common TA of a local cell, and does not consider TA change in a satellite switch or handover process in an NTN scenario. This problem may cause beam failure recovery of the UE and NTN service interruption, affecting communication quality.

Figure 3:
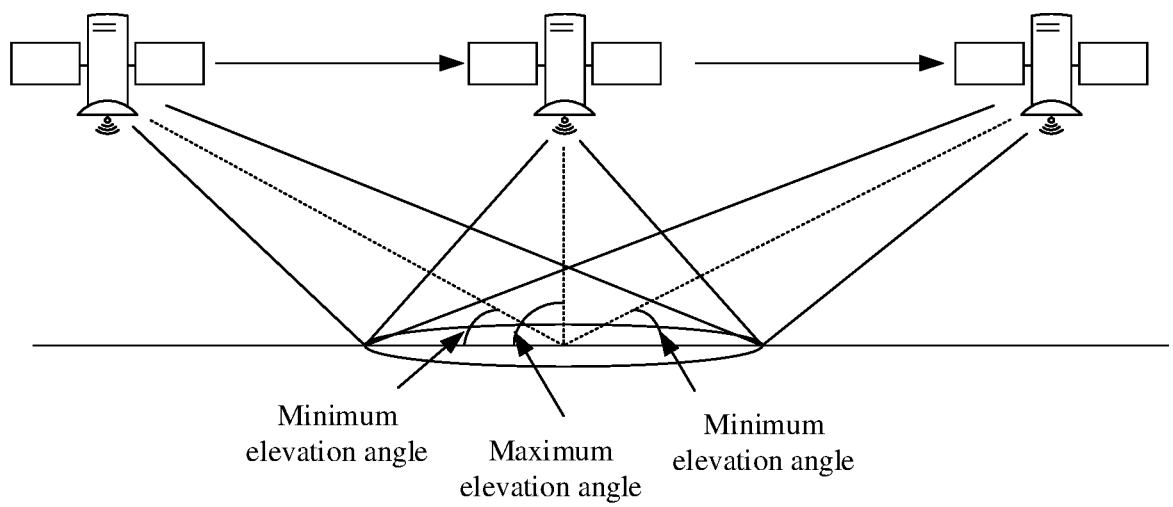
FIG. 3 is a schematic diagram of an LEO satellite-based fixed cell mode in an existing technology.

In an LEO cell, the LEO flies around the earth at a high speed of about 7 km/s. There are two modes for LEO satellite-based earth cells. One is a moving cell mode. In this mode, satellite-based earth cells move with a satellite, a relative distance between the LEO satellite and UE constantly changes, and another LEO satellite will cover the UE when the UE is underserved by signals of a current LEO satellite. The other is a fixed cell mode. FIG. 3 is a schematic diagram of cell coverage in the fixed cell mode. As shown in FIG. 3, in this mode, LEO satellite-based earth cells are stationary with respect to the ground, and the LEO satellite covers a same location on the ground by adjusting an antenna angle. When the ground is out of the coverage of the LEO satellite, another LEO satellite is switched (handed over) to. In the foregoing two modes, when handover is performed between LEO satellites, a distance between the UE and the LEO satellite jumps, leading to TA change. If compensation is not performed in advance, communication between the UE and the satellite may fail.

Connected-state UE is always in a signal measurement state. Due to some reasons, for example, movement, when a measurement result triggers some conditions, the UE reports a measurement result to a base station, the base station sends a handover command to the UE, and the UE is handed over to a cell with better quality. In an existing mechanism, for a fixed cell, because various parameters of the cell remain unchanged, the UE is unaware of handover between two satellites, and no cell reselection or handover occurs. According to the existing mechanism, services of the UE are immediately interrupted due to beam failure recovery. For a moving cell, a large quantity of UEs need to be handed over, and the LEO satellite needs to send a handover command to each of the large quantity of UEs, prone to causing a signaling storm.

In embodiments of this application, in the case of the TA change in the NTN scenario, the terminal device can obtain a timing advance of a next base station in advance. It should be understood that in embodiments of this application, there may be one or more terrestrial stations, one or more satellites, or a combination of one or more satellites and one or more terrestrial stations. These are collectively referred to as access network devices.

Figure 4:
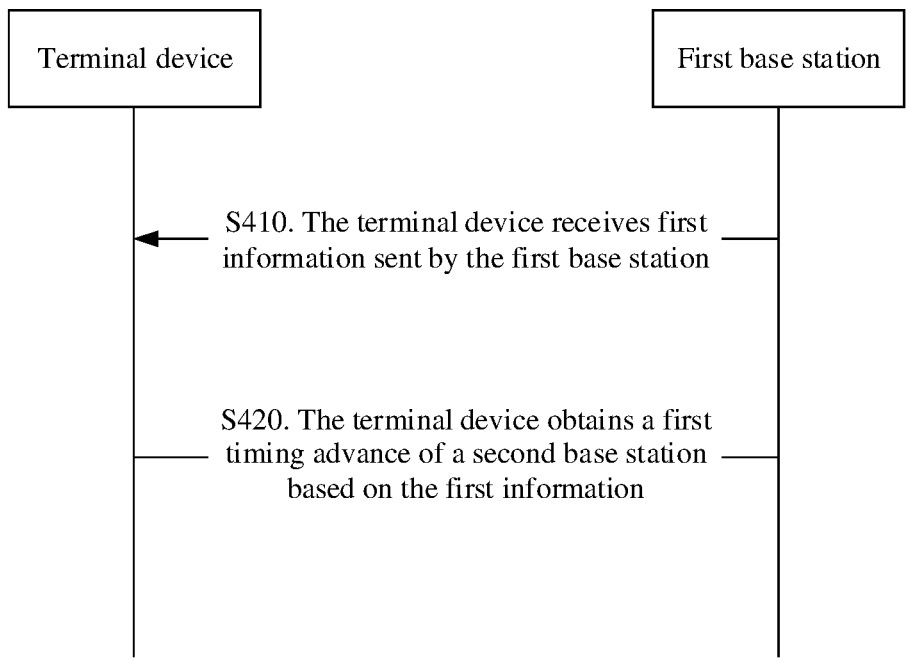
FIG. 4 is a schematic diagram of a communication method according to an embodiment of this application.

Further, the terminal device communicates with a second base station based on the timing advance and information about handover between the base stations, to seamlessly access to the next base station. FIG. 4 is a schematic diagram of a communication method according to an embodiment of this application. As shown in FIG. 4, the method 400 includes steps S410 and S420. The following describes these steps in detail.

S410. A terminal device receives first information sent by a first base station.

In an embodiment, the first information may include a first timing advance of a second base station, where the first timing advance may be a timing advance used in a process of data transmission with the second base station. Optionally, the first timing advance may be calculated by the first base station based on a plurality of parameters. The plurality of parameters may include at least one of the following: a timing advance of the first base station, a location of the terminal device, or a location of the first base station or the second base station. Alternatively, the first timing advance may be obtained by the first base station based on mapping relationship information. The mapping relationship information may include mapping relationships between a plurality of parameter groups and a plurality of timing advances, where each parameter group may include a value of at least one of the following parameters: a timing advance of the first base station, a location of the terminal device, or a location of the first base station or the second base station. Optionally, the base stations may learn of mutual locations based on an ephemeris map. Optionally, the location of the second base station may be sent by the second base station to the first base station.

In another embodiment, the first information may include a parameter used by the terminal device to obtain a first timing advance of a second base station, where the first timing advance is a timing advance used in a process of data transmission between the terminal device and the second base station.

Optionally, the first information may include the parameter used by the terminal device to obtain the first timing advance of the second base station. The parameter may include a timing advance of the first base station, a location of the terminal device, or a location of the first base station or the second base station. The terminal device may obtain the first timing advance through calculation based on the plurality of parameters. Alternatively, the first information may include mapping relationship information. The mapping relationship information is used to indicate mapping relationships between a plurality of parameter groups including a first parameter group and a plurality of timing advances, where each parameter group includes a value of at least one of the following parameters: a timing advance of the first base station, a location of the terminal device, or a location of the first base station or the second base station. Optionally, the mapping relationship information may be sent by the first base station to the terminal device, or the mapping relationship information may be configured by the terminal device itself. This is not limited in this application.

Optionally, the first information may include a second timing advance of the second base station, where the second timing advance is a timing advance used by the terminal device to send a preamble in a process of randomly accessing the second base station by the terminal device. Optionally, the second timing advance may be a common timing advance of the second base station. The second timing advance may be learned of after the two base stations establish an xn interface for interaction.

Optionally, the first information may be broadcast by the first base station.

Figure 5:
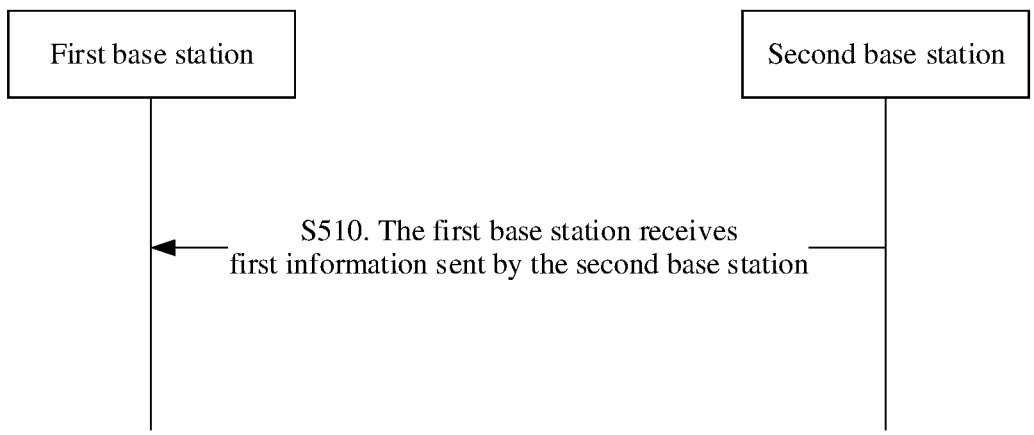
FIG. 5 is a schematic diagram of another communication method according to an embodiment of this application.

In another embodiment, first information may be sent by a second base station to a first base station. FIG. 5 is a schematic diagram of another communication method according to an embodiment of this application. The method 500 includes step S510.

S510. The first base station receives the first information sent by the second base station.

In an embodiment, the first information includes a first timing advance of the second base station, or the first information includes a parameter used by the terminal device to obtain the first timing advance of the second base station, where the first timing advance is a timing advance used in a process of data transmission with the second base station.

A method for the terminal device to obtain the first timing advance is the same as the process in the method 400, and details are not described herein again.

Optionally, the first information may be sent through an Xn interface.

S420. The terminal device obtains the first timing advance of the second base station based on the first information.

In one embodiment, when the first information includes the first timing advance of the second base station, the terminal device may directly obtain the first timing advance of the second base station from the first information.

In another embodiment, the terminal device may obtain the first timing advance of the second base station through calculation based on a parameter included in the first information. Alternatively, the first information may further include mapping relationship information, and the terminal device determines, based on the mapping relationship information, a timing advance corresponding to a first parameter group indicated by the first information as the first timing advance. The parameter or parameter group may include at least one of the following: a timing advance of the first base station, a location of the terminal device, or a location of the first base station or the second base station.

In another embodiment, the terminal device may obtain the first timing advance based on a parameter included in the first information, where the parameter may be a second timing advance of the second base station. Optionally, the second timing advance may be a common timing advance of the second base station. The terminal device may initiate a process of random access to the second base station based on the second timing advance of the second base station, and obtain the first timing advance of the second base station in the process of random access. Optionally, there are at least two second timing advances of the second base station. In this case, the first information may include correspondences between the at least two second timing advances and at least two moments, where the moments may be absolute moments or relative moments. The correspondence may be a list or a formula, for example, common TA=SFN*100+ 6000. The terminal device may select an appropriate moment from the correspondences based on a moment at which random access is initiated, and select the second timing advance corresponding to the moment. The terminal device may initiate a process of random access shown in FIG. 1 based on the second timing advance. Specifically, the terminal device may determine a first moment from the correspondences based on the moment at which the random access is initiated, determine the second timing advance based on the first moment, send a random access preamble to the second base station based on the second timing advance, receive a third timing advance sent by the second base station, and determine the first timing advance based on the second timing advance and the third timing advance. Optionally, the first timing advance may be a sum of the second timing advance and the third timing advance. Optionally, the third timing advance is determined by the second base station based on the preamble, and the third timing advance may be a positive number or a negative number.

Because movement of the terminal device or the base station may cause a change in the timing advance between the terminal device and the base station, the terminal device selects an appropriate timing advance from the correspondences as the second timing advance based on the moment at which the random access is initiated, so that the terminal device can more accurately send the preamble in a handover scenario. This increases a success rate for the base station to process the preamble and further increases a success rate for random access.

In an existing technology, in an NTN scenario, the common TA has been considered into the third timing advance determined by the base station based on the preamble. Generally, the common TA is subtracted from a TA of the UE. Because in the existing technology, a reference point selected by a satellite is a point closest to the ground by default. Therefore, the second timing advance obtained by the base station is always a positive number. However, if the selected reference point is a terrestrial point between which and the satellite is not a shortest distance, the common TA is greater than an actual TA of the UE. In this case, a TA carried in an RAR may be a positive number, while in the existing mechanism, a TA carried in an RAR is always a positive number, and therefore, a negative TA value may be introduced. After the UE receives the TA in the RAR, optionally, the TA may be calculated according to $TA_{new}=TA_{old}+(TA_{RAR}-N)$, where $TA_{old}$ is a common TA read by the UE, and N may be any positive number ranging from 0 to a maximum TA. The rule may be written into a protocol or broadcast.

In an embodiment, the first information may further include information about handover between the first base station and the second base station, where the information about handover may include a location and/or moment at which handover is performed between the first base station and the second base station. The terminal device may communicate with the second base station based on the first time information of the second base station and the information about handover between the first base station and the second base station. Optionally, the handover location may be a relative location or an absolute location, and the location is used for adjustment of an angle of an antenna of the UE. The handover moment may be an absolute moment or a relative moment, and is a moment at which the UE is notified of a next moment for satellite handover. The first timing advance of the second base station is obtained in advance, and the terminal device may be connected to another base station without service interruption based on the information about handover between the first base station and the second base station, or a signaling storm arising from sending a large quantity of handover messages to the terminal device by the base station can be avoided. Therefore, the terminal device can be seamlessly handed over to a next base station after satellite (base station) handover in the NTN scenario.

If an NTN system does not use the foregoing TA compensation mechanism or for other reasons, the UE may trigger cell selection or reselection due to connection interruption between the UE and an original satellite.

In an existing technology, when the terminal device is powered on or a radio link failure occurs, the UE performs a cell search process and selects a suitable cell to camp on as soon as possible. This process is referred to as "cell selection". In the cell search process, the UE reads system information of the cell and obtains parameters such as $Q_{rxlevmeas}$, $Q_{rxlevmin}$ and $Q_{rxlevminoffset}$. Then, the UE evaluates whether the cell is suitable according to the criterion S. Criterion S: Srxlev>0, and Srxlev=$Q_{rxlevmeas}$−($Q_{rslevmin}$+$Q_{rxlevminoffset}$)−$P_{compensation}$−Qoffset$_{temp}$. To be specific, if the value S of the cell is greater than 0, it indicates that the cell is a suitable cell (a cell appropriate for camping on).

Srxlev is a level value calculated in the cell selection/reselection process; $Q_{rxlevmeas}$ is a received signal strength value obtained through measurement by the UE, and this value is a measured reference signal received power. $Q_{rxlevmnin}$ is a minimum received signal strength value required by the cell, and this value is indicated in $Q_{rxlevmin}$ of a system in formation block type 1 (system information block type 1, SIB1). $P_{compensation}$ is max(PEMAX−PUMAX, 0), where $PE_{MAX}$ is a maximum allowed transmit power set by the system when the terminal accesses the cell; and $PU_{MAX}$ is a maximum output power specified according to a terminal class. $Q_{rxlevminoffset}$ is valid only when the UE camps on a visited public land mobile network (visited public land mobile network, VPLMN) and periodically searches a high-priority PLMN for cell selection evaluation. This parameter is used as an offset for $Q_{rxlevmin}$.

After idle-state UE camps on a cell, with movement of the UE, the UE may need to move to another cell having a higher priority or better signal quality to camp on. This is the cell reselection process. After measuring each cell, the terminal device determines whether to reselect to a new cell. Reselection criteria are as follows:

Cell reselection to a cell on a higher priority frequency or system shall be performed if the target frequency cell fulfils Srxlev>Threshx, high during a time interval TreselectionRAT (where Threshx, high is a threshold, and TreselectionRAT is a time interval). Cell reselection to a cell on a lower priority frequency or system shall be performed if a serving cell fulfils Srxlev<Threshserving, low and the target frequency cell fulfils Srxlev>Threshx, low during a time interval TreselectionRAT. Cell reselection to a cell on an equal priority frequency or system shall be based on ranking for intra-frequency cell reselection. In the following, Rs is a ranking value for serving cells, and Rn is a ranking value for neighboring cells: Rs=$Q_{meas,s}$+$Q_{hyst}$−Qoffset$_{temp}$; Rn=$Q_{meas,n}$−Qoffset−Qoffset$_{temp}$. $Q_{hyst}$ is a hysteresis value used to prevent ping-pong reselection; and $Q_{meas}$ is a received signal strength value of a cell measured by the UE. For intra-frequency, Qoffset equals to Qoffsets, n, and for inter-frequency, Qoffset equals to Qoffsets, n plus Qoffsetfrequency. The UE shall perform ranking of all cells that fulfil the cell selection criterion S.

In an NTN scenario, if the UE moves from a cell covered by a GEO/LEO to a cell covered by another GEO/LEO, changes in a distance between the UE and the GEO/LEO may cause changes in a common TA (because reference points selected by base stations are different). To provide more smooth access for the UE, in this embodiment of this application, before receiving the first information sent by the first base station, the terminal device may further receive a fourth timing advance sent by at least one base station, where the fourth timing advance may be a common timing advance of the at least one base station. The fourth timing advance is converted into an offset, for example, Qoffset$_{common\ TA}$, and the offset is substituted into the foregoing cell selection or cell reselection formula to determine the second base station. Optionally, the fourth timing advance sent by the at least one base station may be a timing advance of the first base station and/or a timing advance of a neighboring base station. Optionally, the fourth timing advance may be inversely proportionally to the offset obtained through conversion, or the conversion relationship between the fourth timing advance and the offset obtained through conversion may satisfy a mathematical formula, for example, the offset may be obtained by subtracting a specific value from the fourth timing advance. The conversion relationship may be broadcast in a system message, or may be written into a protocol.

In the cell selection and/or cell reselection, the timing advance is used as a reference, so that the terminal device can select a more suitable cell to access. This improves communication quality.

Optionally, the offset in the foregoing embodiment of this application may be applied to handover of a connected-state terminal device, and may also be applied to cell selection and/or cell reselection of an idle-state terminal device. This is not limited in this application.

Figure 6:
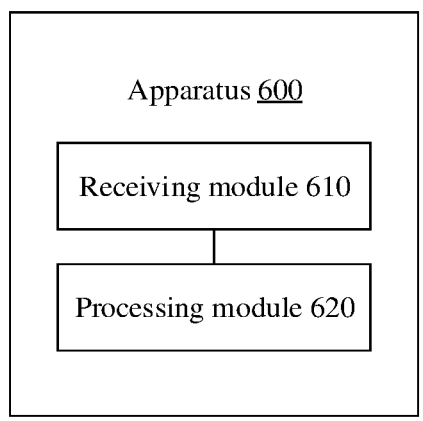
FIG. 6 is a schematic diagram of a communication apparatus according to an embodiment of this application.

FIG. 6 is a schematic diagram of a communication apparatus according to an embodiment of this application. As shown in FIG. 6, the apparatus 600 includes a receiving module 610 and a processing module 620.

The receiving module is configured to receive first information sent by a first base station, where the first information includes a first timing advance of a second base station, or the first information includes a parameter used by the apparatus 600 to obtain the first timing advance of the second base station, and the first timing advance is a timing advance used in a process of data transmission with the second base station. The processing module is configured to obtain the first timing advance of the second base station based on the first information.

Optionally, the first information further includes: information about handover between the first base station and the second base station, where the information about handover includes a location and/or moment at which handover is performed between the first base station and the second base station.

Optionally, the apparatus further includes: a communication module, configured to communicate with the second base station based on the first timing advance of the second base station and the information about handover between the first base station and the second base station.

Optionally, the first information includes the parameter used by the apparatus 600 to obtain the first timing advance of the second base station. The parameter includes at least one of the following: a timing advance of the first base station, a location of the apparatus 600, or a location of the first base station or the second base station. The processing module is configured to obtain the first timing advance of the second base station through calculation based on the parameter.

Optionally, the first information includes the parameter used by the apparatus 600 to obtain the first timing advance of the second base station. The parameter includes: a second timing advance of the second base station, where the second timing advance of the second base station is a timing advance used in a process of accessing the second base station. The processing module is configured to initiate, based on the second timing advance of the second base station, the process of accessing the second base station; and obtain the first timing advance of the second base station in the access process.

The communication apparatus 600 may alternatively be implemented in another manner, for example, implemented by using at least one processor, a memory, and a transceiver. A function of the receiving module 610 may be implemented by using the transceiver, a function of the processing module 620 may be implemented by using the processor, and the processor may implement the foregoing solutions by invoking a program in the memory.

Figure 7:
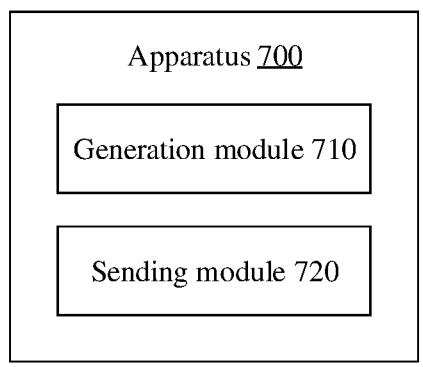
FIG. 7 is a schematic diagram of another communication apparatus according to an embodiment of this application.

FIG. 7 is a schematic diagram of another communication apparatus according to an embodiment of this application. As shown in FIG. 7, the apparatus 700 includes a generation module 710 and a sending module 720.

The generation module 710 is configured to generate first information, where the first information includes a first timing advance of a second base station, or the first information includes a parameter used by the terminal device to obtain the first timing advance of the second base station, and the first timing advance is a timing advance used in a process of data transmission between the terminal device and the second base station.

The sending module is configured to send the first information to the terminal device.

Optionally, the first information further includes: information about handover between the apparatus 700 and the second base station, where the information about handover includes a location and/or moment at which handover is performed between the apparatus 700 and the second base station.

Optionally, the first information includes the parameter used by the terminal device to obtain the first timing advance of the second base station. The parameter includes at least one of the following: a timing advance of the apparatus 700, a location of the terminal device, or a location of the apparatus 700 or the second base station.

Optionally, the first information includes the parameter used by the terminal device to obtain the first timing advance of the second base station. The parameter includes: a second timing advance of the second base station, where the second timing advance of the second base station is a timing advance used in a process of accessing the second base station.

Optionally, the first information is broadcast by the apparatus 700.

Optionally, the first information is sent by the second base station to the apparatus 700, and the apparatus further includes: receiving the first indication information sent by the second base station.

The communication apparatus 700 may alternatively be implemented in another manner, for example, implemented by using at least one processor, a memory, and a transceiver. A function of the sending module 720 may be implemented by using the transceiver, a function of the generation module 710 may be implemented by using the processor, and the processor may implement the foregoing solutions by invoking a program in the memory.

In the several embodiments provided in this application, it should be understood that the disclosed apparatuses and methods may be implemented in other manners. For example, the foregoing described apparatus embodiments are merely examples. For example, the module division is merely logical function division and there may be other division in an actual implementation.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedures or functions according to embodiments of the present invention are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method, comprising:
receiving, by a terminal device, first information sent by a first base station, wherein the first information comprises a parameter usable by the terminal device to obtain a first timing advance of a second base station, and the first timing advance is a timing advance configured to be used in a process of data transmission with the second base station; and
obtaining, by the terminal device, the first timing advance of the second base station based on the first information;
wherein the parameter comprises a location of the terminal device, or a location of the first base station or the second base station; and
wherein obtaining, by the terminal device, the first timing advance of the second base station based on the first information comprises obtaining the first timing advance of the second base station through calculation based on the parameter; and wherein the first information comprises the parameter usable by the terminal device to obtain the first timing advance of the second base station, and the parameter further comprises:
    a second timing advance of the second base station, wherein the second timing advance of the second base station is a timing advance useable in a process of accessing the second base station.

2. The method according to claim 1, wherein the first information further comprises:
    information about handover between the first base station and the second base station, wherein the information about handover comprises a location at which handover is performed between the first base station and the second base station.

3. The method according to claim 2, further comprising:
    communicating, by the terminal device, with the second base station based on the first timing advance of the second base station and the information about handover between the first base station and the second base station.

4. The method according to claim 1, wherein the second base station is comprised in a non-terrestrial network.

5. The method according to claim 1, wherein the first information further comprises:
    information about handover between the first base station and the second base station, wherein the information about handover comprises a moment at which handover is performed between the first base station and the second base station.

6. The method according to claim 1, wherein the parameter further comprises a location of the terminal device.

7. The method according to claim 1, wherein the parameter further comprises a location of the first base station.

8. The method according to claim 1, wherein the parameter further comprises a location of the terminal device and a location of the first base station or the second base station.

9. The method according to claim 1, wherein the first information comprises mapping relationships between a plurality of parameter groups and a plurality of timing advances, and each parameter group includes a corresponding location of the terminal device, a corresponding location of the first base station, or a corresponding location of the second base station.

10. A terminal device, comprising:
    at least one processor; and
    at least one non-transitory memory coupled to the at least one processor, the at least one memory comprising instructions that, when executed by the at least one processor, cause the terminal device to perform operations comprising:
        receiving first information sent by a first base station, wherein the first information comprises a parameter usable by the terminal device to obtain a first timing advance of a second base station, and the first timing advance is a timing advance usable by the terminal device in a process of data transmission with the second base station; and
        obtaining the first timing advance of the second base station based on the first information;
    wherein the parameter comprises a location of the terminal device, or a location of the first base station or the second base station; and
    wherein obtaining the first timing advance of the second base station based on the first information comprises obtaining the first timing advance of the second base station through calculation based on the parameter; and wherein the first information comprises the parameter usable by the terminal device to obtain the first timing advance of the second base station, and the parameter further comprises:
    a second timing advance of the second base station, wherein the second timing advance of the second base station is a timing advance useable in a process of accessing the second base station.

11. The terminal device according to claim 10, wherein the first information further comprises:
    information about handover between the first base station and the second base station, wherein the information about handover comprises a location or a moment at which handover is performed between the first base station and the second base station.

12. The terminal device according to claim 10, wherein the operations further comprise:
    communicating with the second base station based on the first timing advance of the second base station and information about handover between the first base station and the second base station.

13. The terminal device according to claim 10, wherein the second base station is comprised in a non-terrestrial network.

14. A first base station, comprising:
    at least one processor; and
    at least one non-transitory memory coupled to the at least one processor, the at least one non-transitory memory comprising instructions that, when executed by the at least one processor, cause the first base station to perform operations comprising:
        generating first information, wherein the first information comprises a parameter used by a terminal device to obtain a first timing advance of a second base station, and the first timing advance is a timing advance used in a process of data transmission between the terminal device and the second base station; and
        sending the first information to the terminal device; and
    wherein the parameter comprises a location of the terminal device, or a location of the first base station or the second base station, and the terminal device obtains the first timing advance of the second base station through calculation based on the parameter; and
    wherein the first information comprises the parameter used by the terminal device to obtain the first timing advance of the second base station, and the parameter further comprises:
    a second timing advance of the second base station, wherein the second timing advance of the second base station is a timing advance useable in a process of accessing the second base station.

15. The first base station according to claim 14, wherein the first information further comprises:
    information about handover between the first base station and the second base station, wherein the information about handover comprises a location or a moment at which handover is performed between the first base station and the second base station.

16. The first base station according to claim 14, wherein the first information is broadcast by the first base station.

17. The first base station according to claim 14, wherein the first information is sent to the first base station by the second base station, and the operations further comprise:
    receiving first indication information sent by the second base station.

18. The first base station according to claim 14, wherein the second base station is comprised in a non-terrestrial network.

19. The first base station according to claim 14, wherein the first base station and the second base station are comprised in a non-terrestrial network.

\* \* \* \* \*